United States Patent [19]
Van de Pas et al.

[11] Patent Number: 5,329,132
[45] Date of Patent: Jul. 12, 1994

[54] POSITIONING DEVICE WITH LINEAR SCANNING AND ANGLED CODE LINES

[75] Inventors: Leo Van de Pas, Antwerp; Rudi Vanhoutte, Brecht, both of Belgium

[73] Assignee: Elektriciteit voor Goederenbehandeling Marine en Industrie, in her verkort Egemin, naamloze vennootschap, Schoten, Belgium

[21] Appl. No.: 2,806

[22] Filed: Jan. 11, 1993

[30] Foreign Application Priority Data

Jan. 22, 1992 [BE] Belgium .............................. 09200060

[51] Int. Cl.$^5$ .............................................. G01N 21/86
[52] U.S. Cl. ...................... 250/560; 356/401
[58] Field of Search ............... 250/206.1, 206.2, 561, 250/566, 568, 555–557, 560; 901/47; 356/1, 375, 400–401; 282/67; 358/107; 235/375, 383–385, 462

[56] References Cited

U.S. PATENT DOCUMENTS

| | | | |
|---|---|---|---|
| 4,176,996 | 12/1979 | Oku | 414/273 |
| 4,331,417 | 5/1982 | Shearer, Jr. | 250/223 R |
| 4,602,163 | 7/1986 | Pryor | 250/561 |
| 4,613,942 | 9/1986 | Chen | 250/557 |
| 4,914,460 | 4/1990 | Caimi et al. | 901/47 |
| 4,980,971 | 1/1991 | Bartschat et al. | 901/47 |
| 5,166,535 | 11/1992 | Takahashi | 250/560 |
| 5,215,423 | 6/1993 | Schulte-Hinsken et al. | 901/47 |

FOREIGN PATENT DOCUMENTS 0185816  7/1986  European Pat. Off. .

OTHER PUBLICATIONS

Stevenage, "Robot Guidance Using Standard Mark", *Electronics Letters*, No. 21, Oct. 13, 1988, pp. 1326–1327.

*Primary Examiner*—David C. Nelms
*Attorney, Agent, or Firm*—Foley & Lardner

[57] ABSTRACT

Positioning device equipped with a linear scanning device and at least one support with at least one contrasting code line provided on it. A useful part thereof is directed at an angle other than zero and 90 degrees with regard to the scanning device. At least one extra line forms a line of reference and forms an angle other than zero and 90 degrees with the code line, whereby the relative position of the above-mentioned lines can be read by the scanning device.

23 Claims, 4 Drawing Sheets

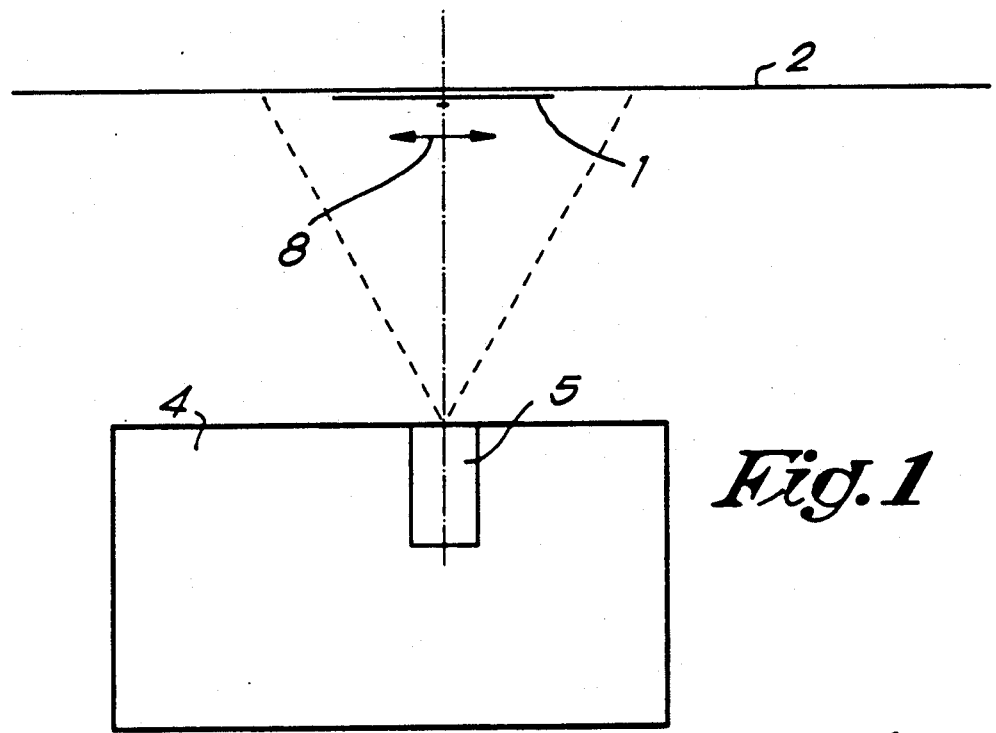
Fig.1
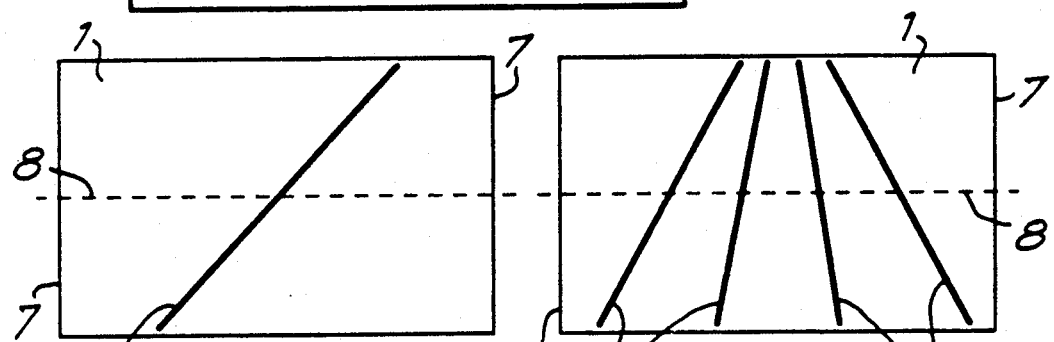 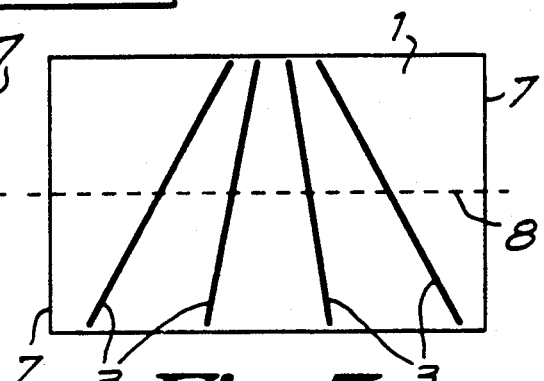
Fig. 2    Fig. 3
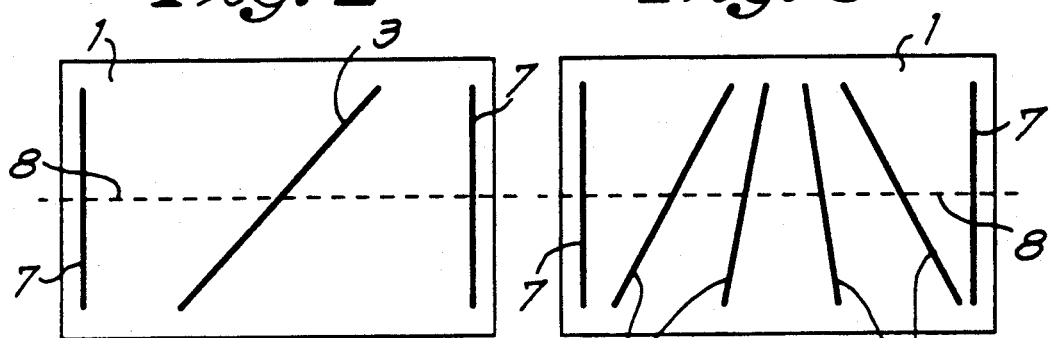 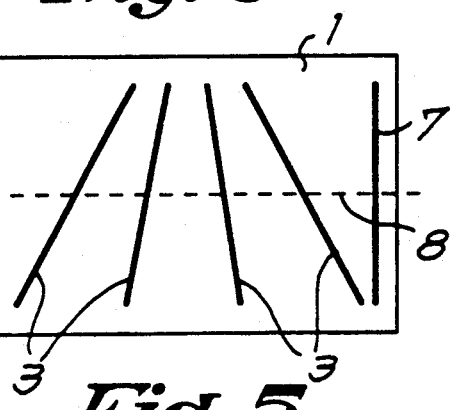
Fig. 4    Fig. 5

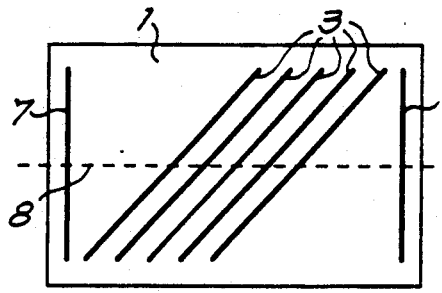
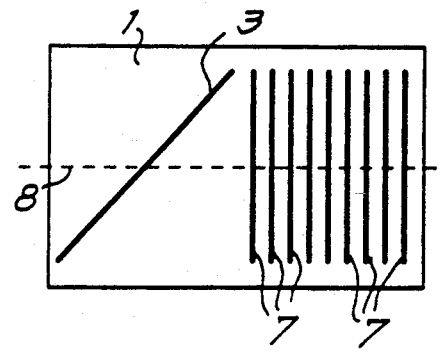
Fig. 6　　　Fig. 7
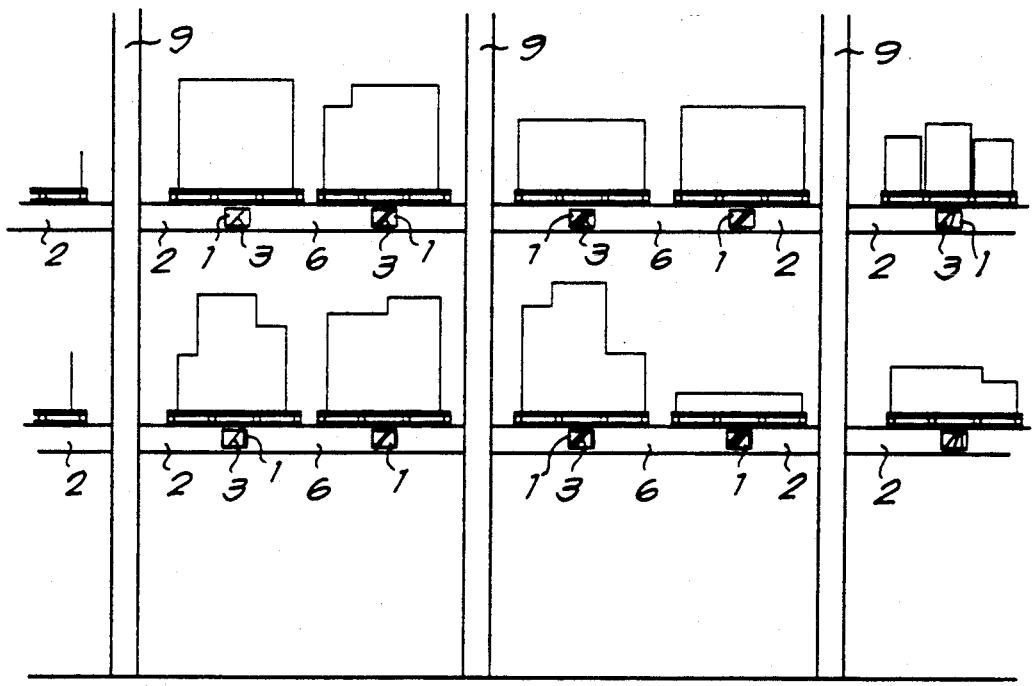
Fig. 8

POSITIONING DEVICE WITH LINEAR SCANNING AND ANGLED CODE LINES

BACKGROUND OF THE INVENTION

The invention concerns a positioning device.

Identification devices are known having a scanning device and supports with a so-called barcode consisting of a number of parallel, contrasting lines of various thicknesses and/or placed at various distances from one another. These code lines are all at right angles to the normal scanning direction of the scanning device.

Such identification devices are quite sufficient when the only purpose is to obtain information regarding the price, the nature or manufacturing data of a product or object the code line or lines are related to.

However, when it comes to determining a position, in other words when the support with the code line or lines and the scanning device must be positioned in relation to one another, the above-mentioned known barcode with code lines directed at right angles to the scanning direction will not suffice.

This is for example the case when guiding automatically controlled vehicles in warehouses or workshops and such in. The vehicles are guided, for example, over guides mounted in the floor and have to leave their normal course at certain positions and have to stop at a certain position to be identified. This is, for example, also the case with automatically controlled lifts, among others in automatic warehouses, which have to pick up an object from or place it in a certain position to be identified in a stacking rack.

Until now, for exact positioning, use is made in such cases of a double system per positioning device.

The target position is closely approached at high speed by means of a conventional positioning system on the one hand, after which the target position is exactly detected at low speed by means of another system.

Especially in systems with large variations in load and/or systems whereby under the influence of variable loads or other external influences relative shifts in place or mechanical distortions occur, this working method is relatively slow. In many cases, a system will have to wait for the positioning in one direction until another system has completed the positioning in another, usually perpendicular direction, which also reduces the speed.

Moreover, if every position has to be unambiguously identified, an extra identification system will have to be added.

SUMMARY OF THE INVENTION

The invention aims to remedy these disadvantages and to provide a positioning device having a simple construction and allowing for a fast relative positioning according to one, two or three axes, moreover having the possibility of identifying the position unambiguously, by means of one single system having a very simple construction and at least one code line on a support.

To this aim the positioning device is equipped with a linear scanning device and at least one support. At least one contrasting code line is provided on it, of which a useful part is directed at an angle other than zero and 90 degrees with regard to the scanning device. At least one extra line forms a line of reference and forms an angle other than zero and 90 degrees with the code line, whereby the relative position of the abovementioned lines can be read by the scanning device.

The support can be a label, packaging or an object or product itself.

The useful part, being the part which is scanned by the scanning device, of the code line and the line of reference can both be bent or straight. In the most simple embodiment the useful part of these lines is straight.

According to a special embodiment of the positioning device, the line of reference is formed by an edge of the support itself.

This embodiment is especially suitable if the support is a label which is provided on a base, for example a part of a stacking rack in a color contrasting with that of the label or having a reflection degree which strongly deviates from the label.

According to another special embodiment of the positioning device, the line of reference is an extra line provided on the support.

Of course the coding possibilities increase if more than one code line and/or more than one line of reference is provided on the support.

Hereby, these code lines can both be parallel to one another and for example form a barcode, or form an angle together whereby this mutual angle can also determine the code. Apart from information related to the relative position of the code line combination, this combination can also contain other information allowing identification of the line combination itself. Also lines of reference can form a barcode and contain information for identification.

BRIEF DESCRIPTION OF THE DRAWINGS

In order to better explain the characteristics according to the invention, by way of example only and without being limitative in any way, the following preferred embodiments of a positioning device according to the invention are described with reference to the accompanying drawings, in which:

FIG. 1 shows a positioning device according to the invention in a schematic manner;

FIG. 2 shows a front view of a label from the positioning device in FIG. 1;

FIGS. 3, 4, 5, 6 and 7 show front views analogous to that in FIG. 2, but related to other embodiments of the label;

FIG. 8 is a schematic representation of a stacking rack on which labels of a positioning device according to the invention are provided;

DETAILED DESCRIPTION OF THE PREFERRED EMBODIMENTS

Figure 9:
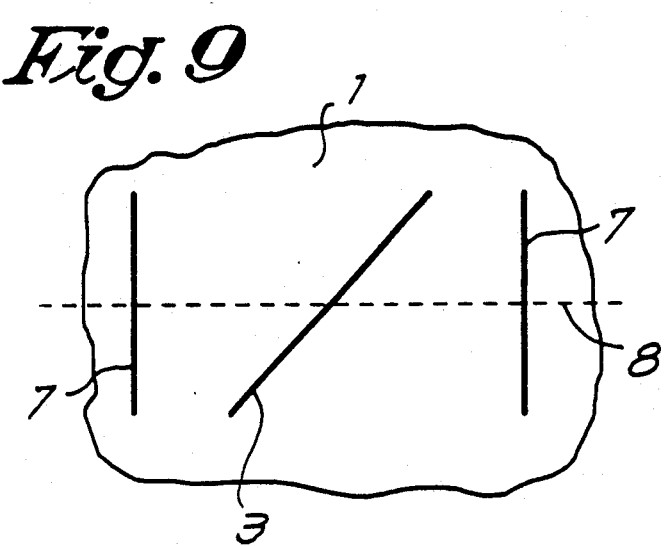
FIG. 9 is a schematic representation of code lines and lines of reference, directly provided on an object, from a positioning device according to the invention.

The positioning device according to FIG. 1 contains a label 1 applied on a substrate 2 and provided with a contrasting code line 3 and a linear reading or scanning device 5 mounted on a unit 4, whereby the substrate 2 with the label 1 and/or the unit 4 can be mobile.

The scanning device 5 has a known construction and thus is not further described here. Suitable scanning devices are the known barcode readers, for example equipped with laser scanner or with linear CCD array.

Essential for the invention is that, as shown in detail in FIG. 2, the part of the code line 3 which is useful for the scanning device 5 (according to FIG. 2 the entire code line 3), is pointed at an angle other than 0 and 90 degrees to the scanning direction, whereby this scanning direction is horizontal and thus forms 90 degrees with the standing edges 7 of the label 1 and is represented in FIG. 1 by the arrows 8 and in FIG. 2 by the dashed line 8. This code line 3 is also directed to the two lines of reference 7 at an angle other than 0 and 90 degrees which, in the embodiment represented in FIG. 1, is formed by the standing edges of the label 1.

The known distances between lines 3 and 7, nonparallel to the code line 3 with regard to the lines of reference 7 and detected by the scanning device 5, not only make it possible to identify the label 1 with the lines 3 and 7, but also to determine the relative position of the line combination and the label 1 with regard to the scanning device 5 one-, two- or three-dimensionally. The positioning device can also be used to, for example, guide a mobile unit 4 to the position of the label 1 which was first identified through comparison with information stored in a memory built-in or connected to the scanning device 5.

In the embodiment of the label 1 shown in FIG. 3, several code lines 3 have been provided on the label 1. All code lines 3 form an angle other than 0 and 90 degrees both with the scanning direction of the scanning device 5 and with each other. The standing edges of the label 1 form the lines of reference 7, although it is possible in this case to use the code lines themselves as lines of reference, which implies, however, that only two dimensions can be measured, so that the third dimension must be invariable and known.

The relation between the inclinations of the code line 3 is known and the mutual distances between the code lines 3 and the lines of reference 7 and/or the code lines 3 among themselves are determined by the scanning device 5. This makes it possible to identify the code line combination on the one hand and to determine the relative position of said code line combination with regard to the scanning device 5 one-, two- or three-dimensionally.

The embodiments of the label 1 shown in FIGS. 4 and 5 correspond to those represented in FIGS. 2 and 3 respectively, with this difference that the lines of reference 7 are not formed by standing edges of the label but by material, for example printed lines provided on the label which are at an angle of 90 degrees with regard to the scanning device.

The embodiment according to FIG. 6 differs from the embodiment according to FIG. 5 in that the different code lines 3 do not point away from one another or towards one another, but are parallel to one another, as in a barcode. The inclination of the code lines 3 and their distance to the lines of reference 7 pointed crosswise to the scanning direction 8 form coding elements to determine the relative position, whereas, as in a barcode, the number, the relative position and possibly the thickness of the code lines 3 allow for an identification of the label 1.

The embodiment of the label 1 represented in FIG. 7 differs from the embodiment represented in FIG. 4 in that, instead of one line of reference 7 on each side of the code line 3, a series of parallel lines of reference 7 are now provided on one and the same side of the code line 3. These lines of reference 7 can form a barcode which allows for the identification of the label 1.

Hence, an interesting application of the positioning device is the automatic control of trolleys being guided over a guide network in the ground or the automatic control of lifts with regard to stacking racks. FIG. 8 shows a part of such a stacking rack 9 whereby on the foremost edge 6 of the horizontal leaves labels 1 with different code lines 3 are provided. The scanning device 5 of the lift identifies the correct label 1 according to an inserted program and through interaction of the lines 3 and 7 of the label 1 with the control mechanism, the lift is very quickly put in the right position to remove or place the required pallet 10 from the stacking rack 9.

The support does not necessarily have to be a label. The code lines and the line of reference may for example be provided directly onto objects such as the stacking rack or the pallets or also on the stacked products themselves, as represented in FIG. 9.

Figure 10:
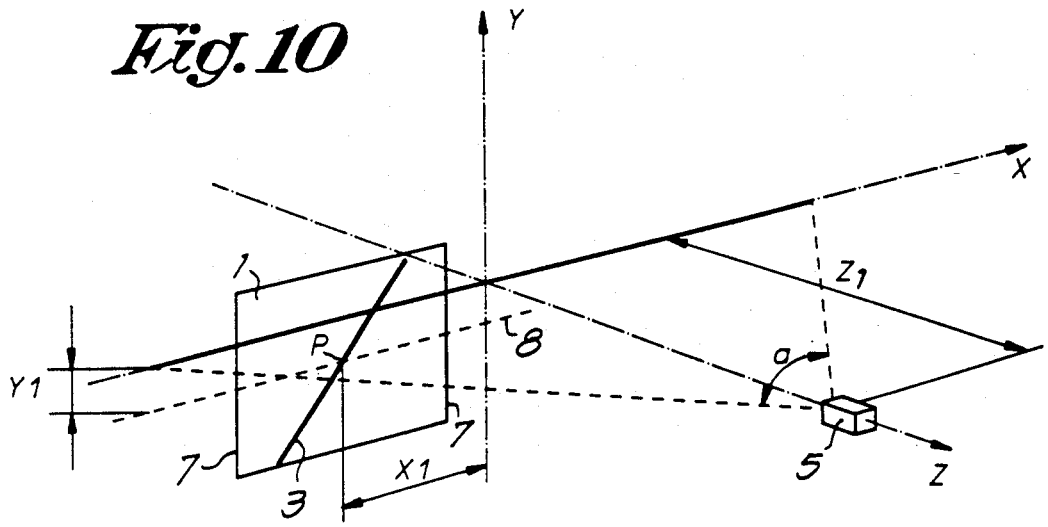
FIG. 10 is a schematic representation of a positioning device according to the invention during the scanning of a label by the scanning device.

The invention will be further illustrated by means of the following example:

We start from the situation represented in FIG. 10, whereby the central axis Z of the scanning device 5 is situated on top of (at a distance Y1) and to the right of (at a distance X1) the center point of the label 1 and whereby the entire label 1 falls in the field of view of the scanning device 5 according to the axis X.

Figure 11:
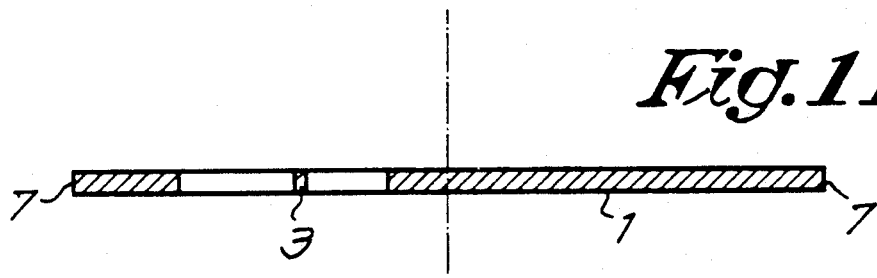
FIG. 11 represents the image seen by the scanning device in FIG. 10 during the scanning.

The scanning device 5, which for example may be a simple laser beam scanner or a simple linear CCD array, then "sees" an image as represented in FIG. 11.

Figure 12:
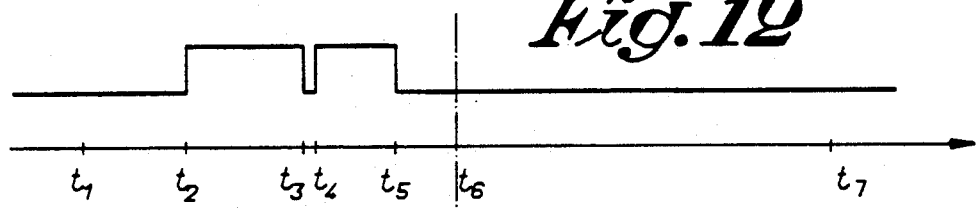
FIG. 12 represents the electric signal as a function of time generated by the scanning device in FIG. 10.

In both cases the scanning device 5 will generate an electric signal which as a function of time may look like that represented in FIG. 12.

Figure 13:
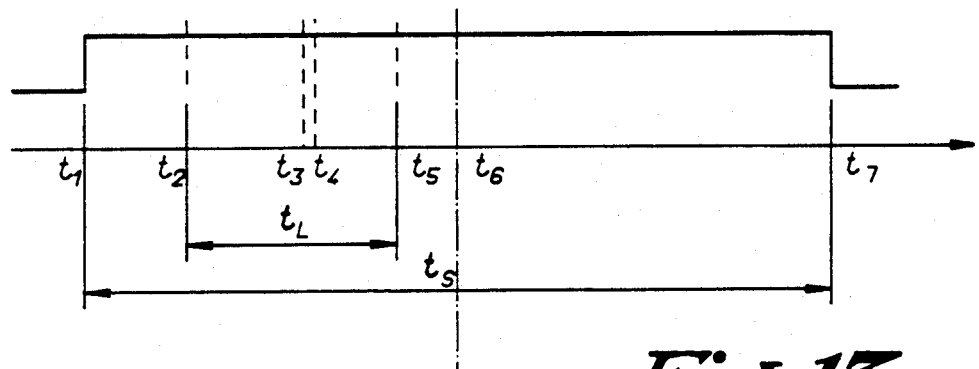
FIG. 13 represents the time required by the scanning device to complete the field of view.

In both cases the time required to complete the entire field of view of the scanning device, as represented in FIG. 13, is known.

Figure 14:
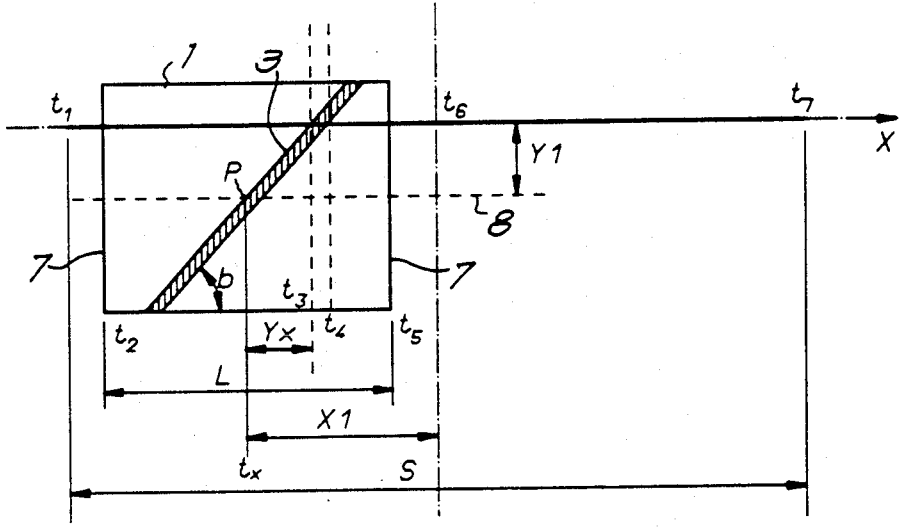
FIG. 14 shows a front view of the label in FIG. 10 indicating the different values.

Also the total geometry of the label as represented in FIG. 14 is known in the device, as well as the optic angle a of the scanning device 5 as represented in FIG. 10.

a. Determination of the distance $Z_1$ of the label 1 in relation to the scanning device 5.

Known and indicated in FIGS. 12 and 13 are:

the label size L according to the axis X.

the time $t_L$ required to scan the label (between two standing edges serving as lines of reference 7) $t_L = t_5 - t_2$ (whereby $t_2$ and $t_5$ are the starting and end time respectively of the scanning of the label).

the total time required for one single scanning: $t_S = t_7 - t_1$ (whereby $t_1$ and $t_7$ are the starting and end time respectively of the entire scanning).

Thus, the length of the entire scanning line of the scanning device $S = L (t_S/t_L)$.

Since the optic angle a (see FIG. 10) of this scanning device 5 is known and starting from the assumption that this angle is small enough, $Z_1$ can be determined as $Z_1 = S/\text{tg } a$.

b. Determination of the distance $X_1$, i.e. the distance according to the axis X between the axis Z of the scanning device and the center P of the label 1:

The position of the center line of the scanning device on the axis X is in units of time: $t_6 = t_1 + 0.5 (t_7 - t_1)$. The position $t_x$ of the center P of the label according to the axis X is thus in units of time:

$$t_x = 0.5(t_2 + t_5) - t_6.$$

(positive or negative depending on the position with regard to the axis Z).

In distance $X_1$ to the center line Z of the scanning device this gives:

$$X_1 = L(t_x/t_L)$$

c. Determination of the distance $Y_1$, i.e. the distance according to the axis Y between the axis Z of the scanning device and the target position, being the center P of the label.

Along the axis X the position Y in units of time is:

$$tY_x = t_x - t_3$$

(whereby $t_3$ is the time in which the code line 3 is reached).

Expressed in distance according to the axis X:

$$Y_x = L(t_x - t_3)/(t_5 - t_2) = L(tY_x/t_L),$$

and according to the axis Y: $Y_1 = Y_x \text{ tg } b$, whereby b is the known angle of the code line 3 with the scanning direction 8.

In the above the label size L was used, i.e. the total length of the label according to the axis X. In case separate lines of reference 7 are printed on the label as shown in FIG. 4, and subsequently the standing edges of the label are not used, this label size should be replaced by the distance between the lines of reference 7 pointed crosswise to the axis X.

In the case where the standing edges of the label 1 are not used as lines of reference 7, one known line of reference 7 will in fact do for positioning according to the axes X and Y. However, the distance $Z_1$ cannot be determined in this case and the distance of the scanning device to the label 1 should be invariable and known. The value L in the above-mentioned formulas to calculate $X_1$ and $Y_1$ is in this case also known in the system.

The positioning device described above has a very simple construction and allows for a quick identification and positioning by means of a simple linear scanning device.

The deviation from the target position P, being the centre of label 1, is determined quickly both according to the axis X and the axis Y and can possibly be reduced by means of a controlled shift of the unit 4 with the scanning device 5 with regard to the label 1 to the desired value, for example zero. In most cases also the distance to the label 1 can be simultaneously determined and can be reduced if required to the desired value by shifting the unit 4 with regard to the label 1.

The present invention is in no way limited to the embodiments described by way of example and shown in the accompanying drawings; on the contrary, such a positioning device can be made in various forms and dimensions while still remaining within the scope of the invention.

In particular the target position P must not necessarily be positioned in the center of the label.

Moreover, an advantage of the positioning system consists in that with one particular label scanning device combination and depending on the target position requirements different target positions P can be selected at a given moment.

We claim:

1. A positioning device comprising:
   (A) a linear scanning device for scanning in a single linear scanning direction;
   (B) at least one support having:
       (1) at least one contrasting code line provided thereon including a useful part directed at an angle other than 0° and 90° with respect to the scanning direction, and
       (2) at least one extra line forming a reference line and forming an angle other than 0° and 90° with the code line; and
   (C) wherein the scanning device outputs a signal representative of the relative position of the code line and the reference line.

2. Positioning device according to claim 1, wherein the useful part is the part which is scanned by the scanning device (5), of the code line (3) and the reference line (7), and which is straight.

3. Positioning device according to claim 1, wherein the reference line (7) is formed by an edge of the support (1).

4. Positioning device according to claim 1, wherein the reference line (7) is an extra line provided on the support (1).

5. Positioning device according to claim 1, further comprising a plurality of code lines (3) on the support (1).

6. Positioning device according to claim 5, wherein the code lines (3) are parallel to one another.

7. Positioning device according to claim 5, wherein the code lines (3) together form an angle other than 0 and 90 degrees.

8. Positioning device according to claim 1, wherein the support (1) is a label.

9. Positioning device according to claim 1, wherein the support (1) has at least two reference lines (7).

10. Positioning device according to claim 9, wherein the reference lines (7) provided on the support (1) are parallel to one another.

11. Positioning device according to claim 9, further comprising means to determine the distance between the scanning device (5) and the support (1), starting from an entire scanning range of the scanning device (5) determined by a known optical angle (a) of the scanning device (5) and its relation to a known distance between two reference lines (7) as perceived by the scanning device (5).

12. Positioning device according to claim 1, wherein at least one reference line (7) is at right angles with regard to the scanning direction.

13. Positioning device according to claim 1, further comprising means to determine a deviation in the scanning direction of the position of this scanning device (5) with regard to a point (P) situated with regard to the reference line (7) on the support (1) starting from the relative position of the code line (3) with regard to at least one line of reference (7) perceived in the scanning direction (8) by the scanning device (5).

14. Positioning device according to claim 1, further comprising means to determine a deviation in a direction pointed crosswise to the scanning direction of the position of the scanning device (5) with regard to a point (P) situated with regard to the reference line (7) on the support (1), starting from the relative position of the code line (3) with regard to at least one line of reference (7) perceived in the scanning direction (8) by the scanning device (5) and with regard to a known angle (b) which forms the useful part of the code line (3) with the scanning device.

15. Positioning device according to claim 1, further comprising means to determine a deviation from an axis (Z) of the scanning device (5) with regard to a point (P) of the support (1) both in the scanning direction and in a crosswise direction, starting from one single code line (3) and one single line of reference (7) with a known and invariable distance ($Z_1$) to the support (1) starting from a relative position of the lines (3 and 7) and a known angle between the useful part of the code line (3) and the scanning device (8).

16. Positioning device according to claim 13, wherein the point (P) on the support (1) is the center of the label (1).

17. Positioning device according to claim 14, wherein the point (P) on the support (1) is the center of the label (1).

18. Positioning device according to claim 15, wherein the point (P) on the support (1) is the center of the label (1).

19. Positioning device according to claim 1, wherein the scanning device includes a laser scanner.

20. Positioning device according to claim 1, wherein the scanner device includes a linear CCD array.

21. Positioning device according to claim 1, wherein the reference line is a contrasting line on the support.

22. Positioning device according to claim 17, wherein the reference lines is an edge of the support.

23. Positioning device according to claim 1, further comprising means for receiving the signal from the scanning device, and for determining the position of the scanning device from the signal and from fixed parameters of the support and the scanning device.

* * * * *